(12) United States Patent
Raffa

(10) Patent No.: US 9,689,704 B2
(45) Date of Patent: Jun. 27, 2017

(54) SKETCH AIDED ROUTE SELECTION FOR NAVIGATION DEVICES AND APPLICATIONS

(71) Applicant: Intel Corporation, Santa Clara, CA (US)

(72) Inventor: Giuseppe Raffa, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/834,012

(22) Filed: Aug. 24, 2015

(65) Prior Publication Data

US 2016/0054141 A1 Feb. 25, 2016

Related U.S. Application Data

(63) Continuation of application No. 13/839,613, filed on Mar. 15, 2013, now Pat. No. 9,116,009.

(51) Int. Cl.
*G01C 21/34* (2006.01)
*G01C 21/36* (2006.01)
*G06F 3/01* (2006.01)

(52) U.S. Cl.
CPC ....... *G01C 21/367* (2013.01); *G01C 21/3461* (2013.01); *G01C 21/3664* (2013.01); *G06F 3/01* (2013.01)

(58) Field of Classification Search
CPC .................................................. G01C 21/367
See application file for complete search history.

(56) References Cited

U.S. PATENT DOCUMENTS

| 5,243,528 | A | 9/1993 | Lefebvre |
| 6,026,346 | A * | 2/2000 | Ohashi ............... G01C 21/3415 340/990 |
| 6,034,626 | A | 3/2000 | Maekawa et al. |
| 6,119,065 | A | 9/2000 | Shimada et al. |
| 6,430,501 | B1 | 8/2002 | Slominski |
| 6,708,113 | B1 | 3/2004 | Gerlach et al. |
| 7,321,824 | B1 | 1/2008 | Nesbitt |
| 7,904,238 | B2 | 3/2011 | Nesbitt |
| 8,019,531 | B2 | 9/2011 | Pinkus et al. |

(Continued)

FOREIGN PATENT DOCUMENTS

| JP | 11083519 | 3/1999 |
| JP | 2011242228 A | 12/2011 |

(Continued)

OTHER PUBLICATIONS

PCT International Search Report and Written Opinion in PCT International Application Serial No. PCT/US2014/024944 mailed on Jul. 7, 2014 (11 pages).

*Primary Examiner* — Thomas Tarcza
*Assistant Examiner* — Michael Berns
(74) *Attorney, Agent, or Firm* — Patent Capital Group

(57) ABSTRACT

One particular example includes a system, comprising a processor and a memory to store instructions that when executed by the processor performs operations, comprising displaying a map of a first area on a display; receiving an instruction to designate a second area on the map to be avoided; displaying the second area to be avoided on the map; and generating a route from a first point to a second point, where the route does not go through the second area to be avoided.

19 Claims, 15 Drawing Sheets

(56) References Cited

U.S. PATENT DOCUMENTS

| | | |
|---|---|---|
| 8,296,061 B2 | 10/2012 | Nesbitt |
| 8,751,155 B2 * | 6/2014 | Lee .................... G01C 21/3626 340/995.23 |
| 8,958,984 B2 * | 2/2015 | Okude ................. G01C 21/343 340/995.19 |
| 9,116,009 B2 | 8/2015 | Raffa |
| 2005/0021228 A1 | 1/2005 | Choi |
| 2008/0162034 A1 | 7/2008 | Breen |
| 2008/0208469 A1 | 8/2008 | Obradovich et al. |
| 2010/0082232 A1 * | 4/2010 | Lee .................... G01C 21/3667 701/533 |
| 2011/0172903 A1 | 7/2011 | Farr |

FOREIGN PATENT DOCUMENTS

| | | |
|---|---|---|
| KR | 1020050102757 | 2/2007 |
| KR | 100777899 B1 | 11/2007 |
| WO | 2014151084 A1 | 9/2014 |

\* cited by examiner

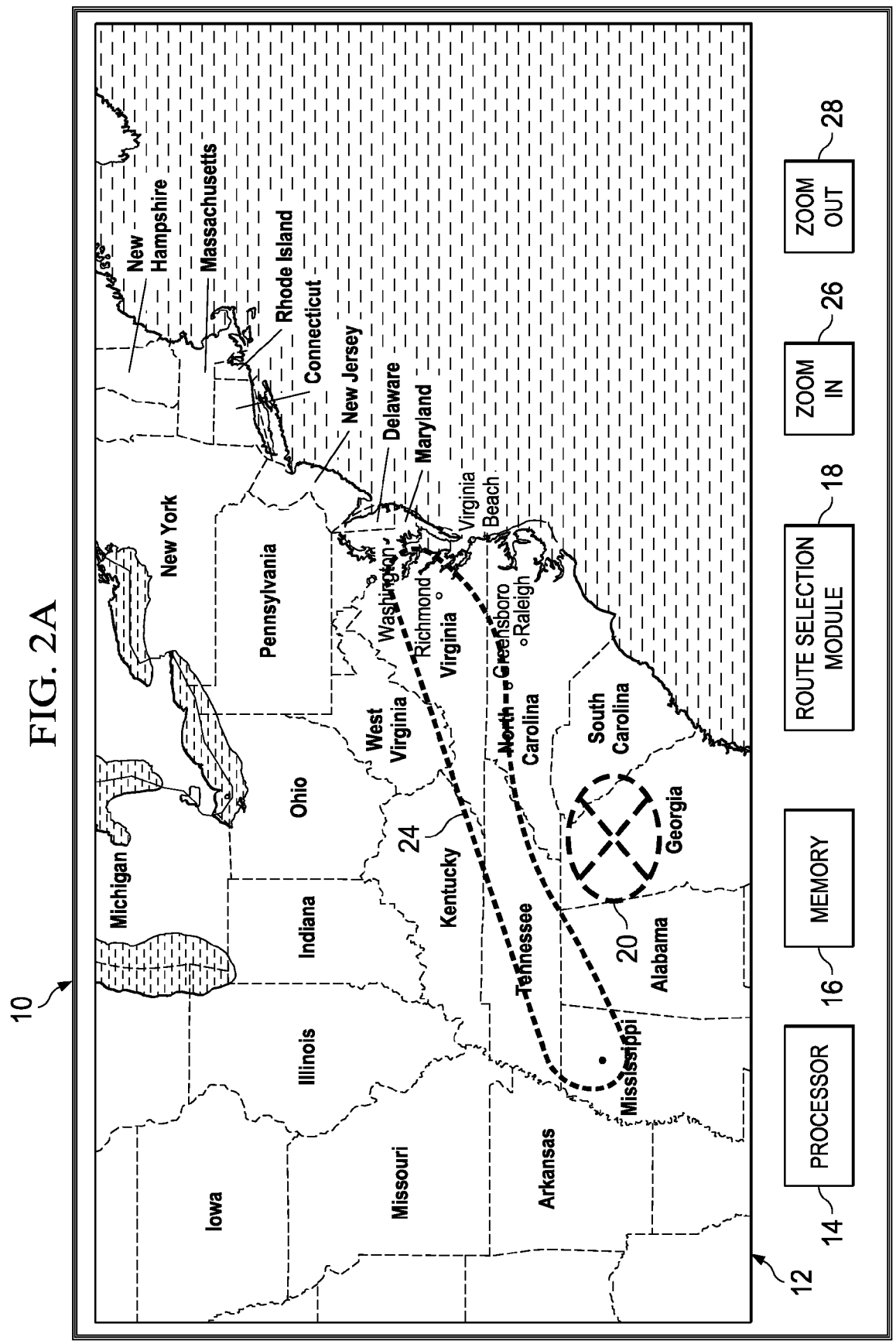

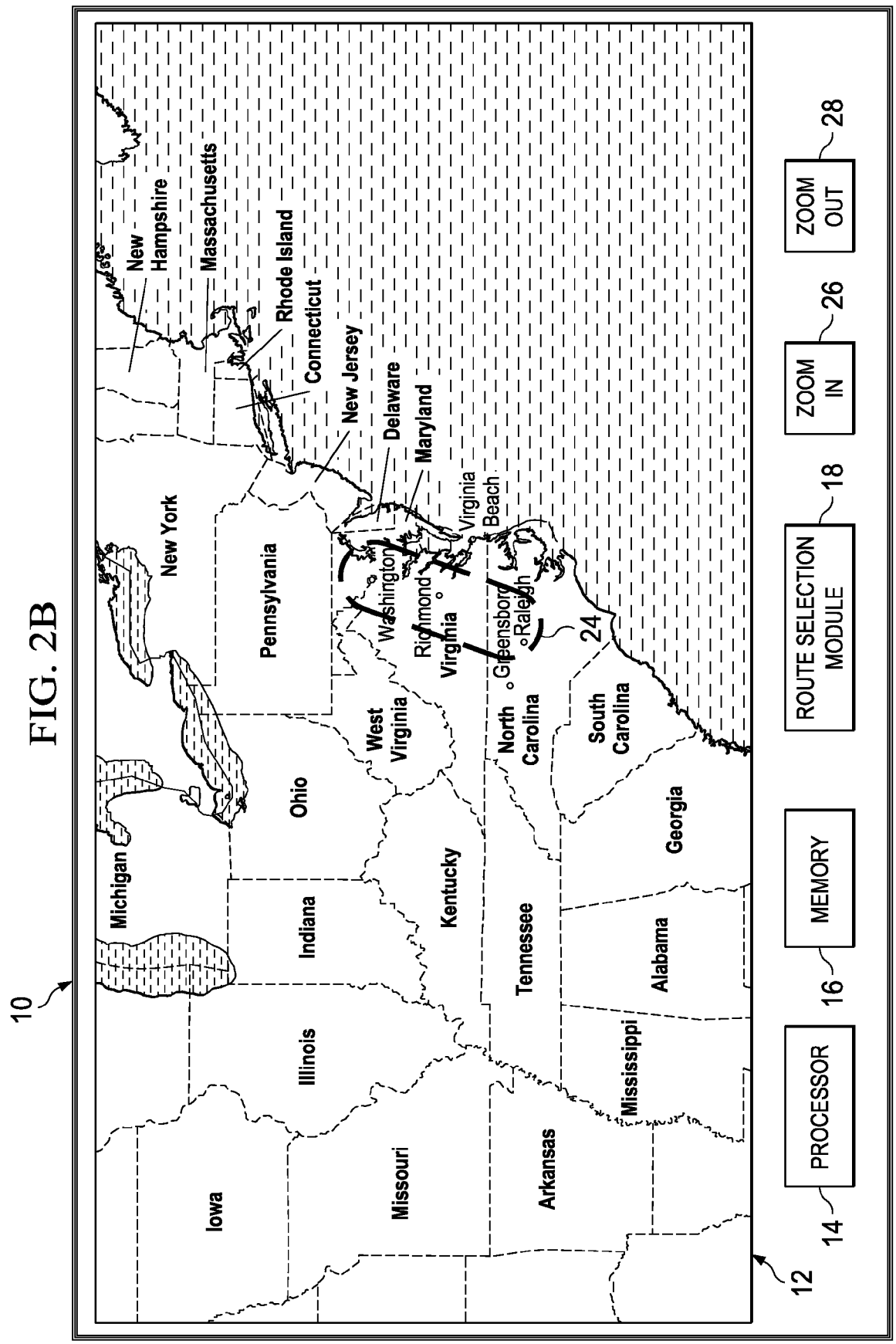

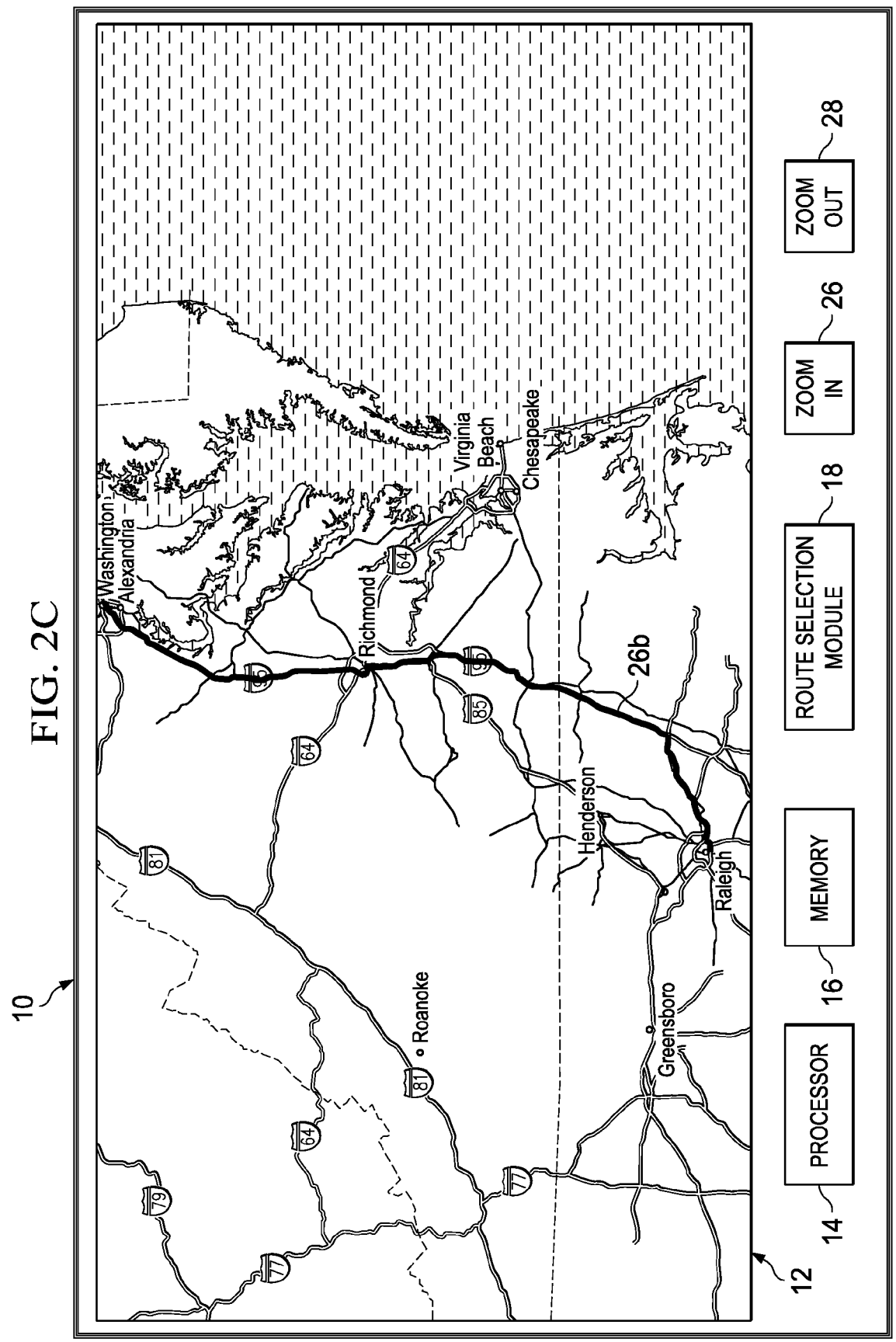

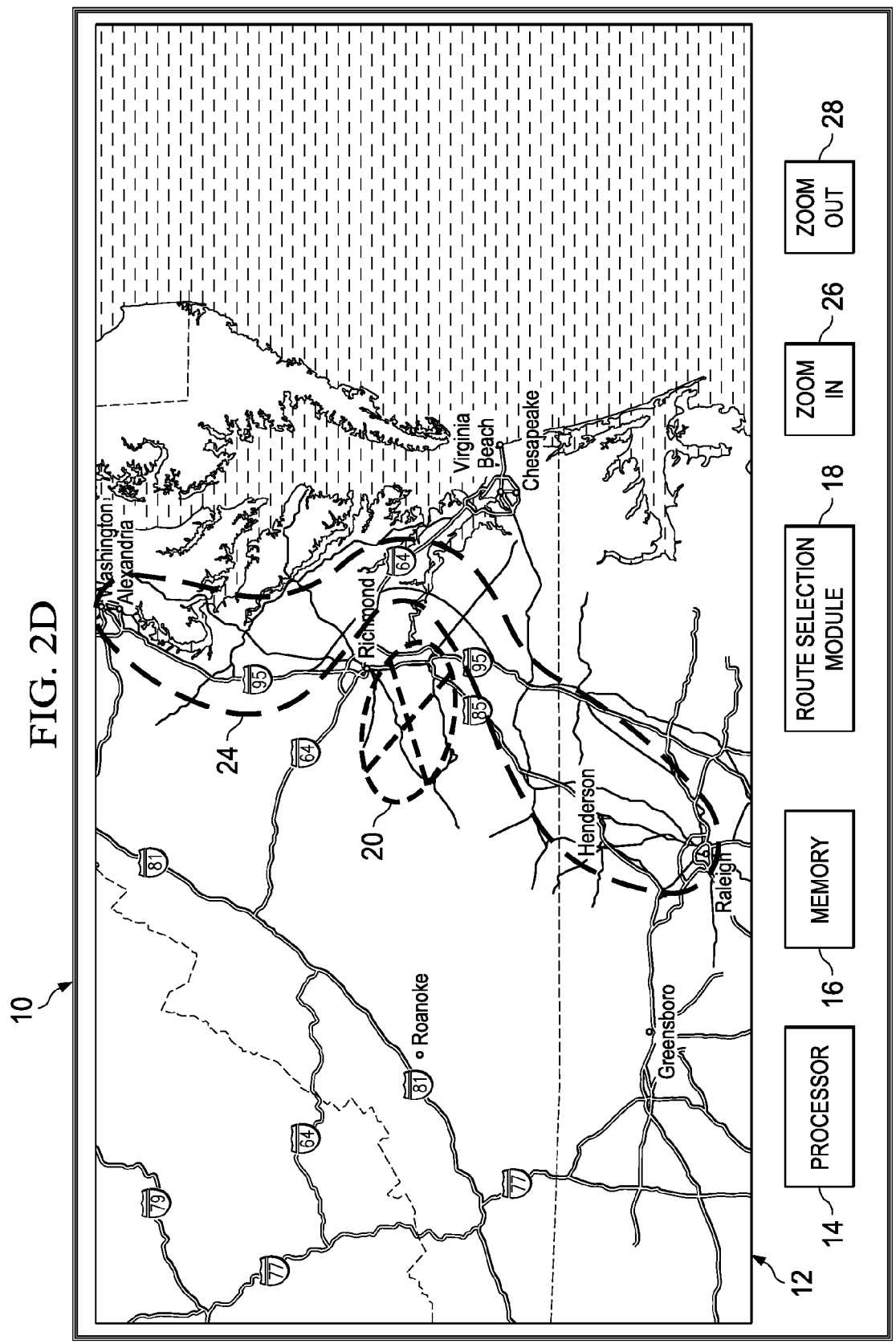

SKETCH AIDED ROUTE SELECTION FOR NAVIGATION DEVICES AND APPLICATIONS

CROSS-REFERENCE TO RELATED APPLICATIONS

This Application is a continuation (and claims the benefit under 35 U.S.C. §120) of U.S. application Ser. No. 13/839,613, filed Mar. 15, 2013 and entitled SKETCH AIDED ROUTE SELECTION FOR NAVIGATION DEVICES AND APPLICATIONS. The disclosure of the prior Application is considered part of and is incorporated by reference in the disclosure of this Application.

TECHNICAL FIELD

Examples described herein generally relate to sketch aided route selection for navigation devices and applications.

BACKGROUND

Navigation systems, electronic maps (also known as digital maps), and geographical positioning devices are increasingly used by travelers to assist with various navigation functions, such as to find destinations and addresses, calculate optimal routes, and provide real-time driving guidance. Typically, the navigation system includes a small display screen or graphic user interface that portrays a network of roads and a general visual display of an area. To find a route to a specific place or address, typically a user will enter the specific place or address and the navigation system will calculate a route to the specific place or address. Then the navigation system will plan a route based on the software used by the navigation system. However, sometimes a user may not want the route to pass through a certain area or may want the route to go through a certain area. Also, a user may have information about an area that the navigation system does not have, such as a new construction area. It would be beneficial if the user could designate areas to be avoided and/or areas that are preferred.

BRIEF DESCRIPTION OF THE DRAWINGS

Examples are illustrated in the figures of the accompanying drawings, in which like references indicate similar elements and in which:

FIG. 2A is a simplified block diagram illustrating an example of an electronic device;

FIG. 2B is a simplified block diagram illustrating an example of an electronic device;

FIG. 2C is a simplified block diagram illustrating an example of an electronic device;

FIG. 2D is a simplified block diagram illustrating an example of an electronic device;

The FIGURES of the drawings are not necessarily drawn to scale or proportion, as their dimensions, arrangements, and specifications can be varied considerably without departing from the scope of the present disclosure.

DETAILED DESCRIPTION

The following detailed description sets forth examples of apparatuses, methods, and systems relating to single touch or dual touch surface multiple function input devices. Features, such as structure(s), function(s), and/or characteristic(s) for example, are described with reference to one example as a matter of convenience; various examples may be implemented with any suitable one or more described features.

Figure 1A:
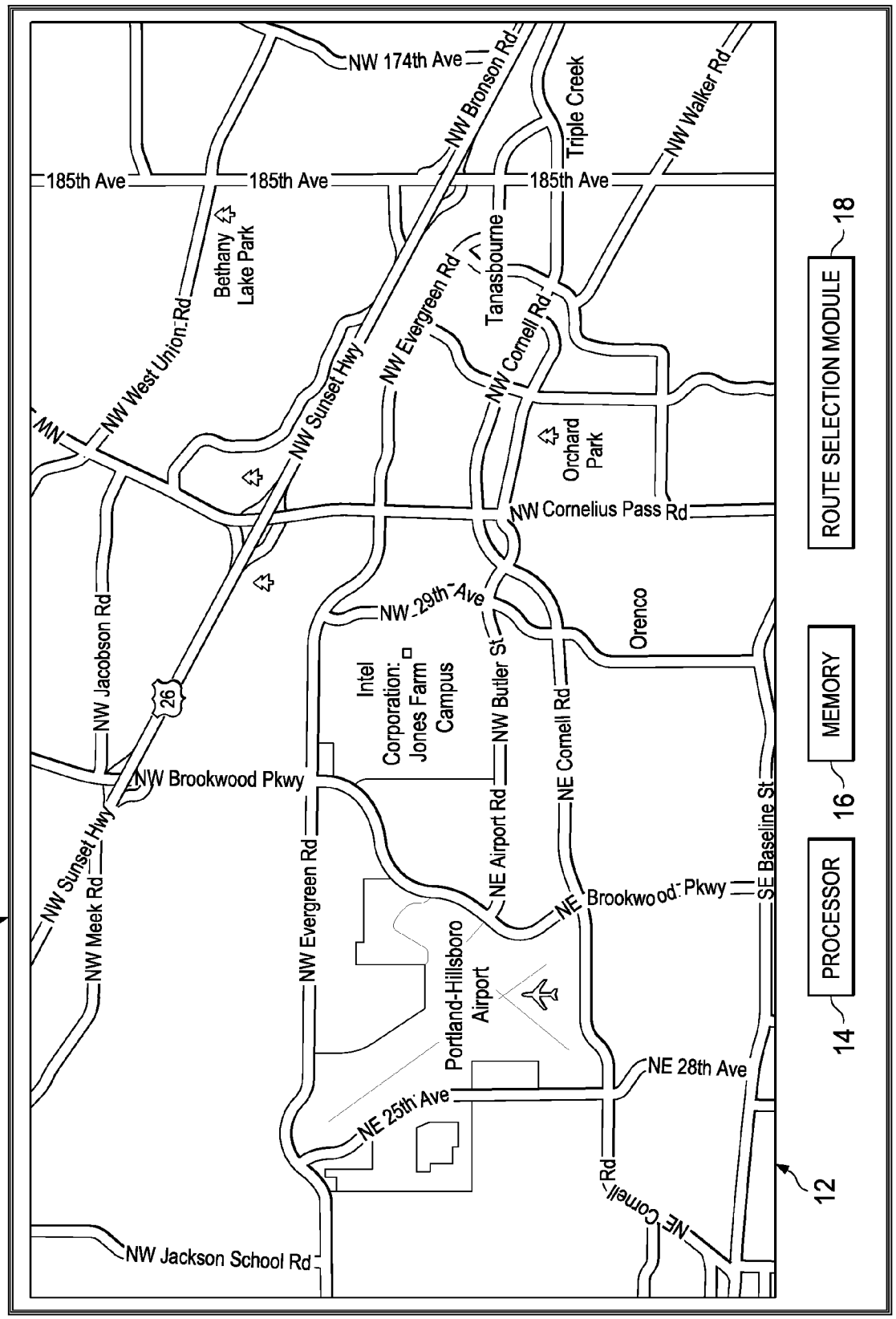
FIG. 1A is a simplified diagram illustrating an example of an electronic device.

FIG. 1A is a simplified diagram illustrating an example of a navigation device 10. Navigation device 10 can include a display 12, a processor 14, a memory 16, and a route selection module 18. The example illustration of FIG. 1A is merely representing one (of the many) possible configurations of an electronic configuration. For example, the number of electrical components may vary, the placement of the electrical components may vary, and/or the like.

Display 12 can be configured to offer a screen on which navigation data can be rendered for a user. Note that as used herein in this Specification, the term 'display' is meant to connote any element that is capable of displaying a digital map of an area to the user. This would necessarily be inclusive of any panel, plasma element, television (which may be high-definition), monitor, computer interface, screen, projector, Telepresence devices (inclusive of Telepresence boards, panels, screens, surfaces, etc.), touch screens, or any other suitable element that is capable of delivering/rendering/projecting such information.

Processor 14 can include one or more processing cores and one or more graphics cores. Processor 14 can execute any type of instructions associated with the data to achieve the operations detailed herein in this Specification. In one example, processor 14 could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that can include digital logic, software, code, electronic instructions, or any suitable combination thereof. Route selection module 18 can be configured to receive input regarding areas on a map (shown on display 12) that are to be avoided, are preferred, are acceptable, etc. It could also receive input as to designating a particular a route (or an interim route) through which the pathway should traverse on the way to the destination.

User interfaces in navigation devices and applications are cumbersome to use when selecting a route based on being given a starting and ending point on a map. In addition, in many scenarios, the navigation system selects a best route from a route optimization perspective, which is only a few minutes better than the route that the user would prefer for personal preferences or based on knowledge that the navigation system does not have. However, interacting with modern navigation systems and providing the correct input, information, and desires that allows for personal preferences or knowledge that the navigation system does not have is challenging. Further, particular touch capabilities of modern navigation systems are not fully exploited.

In an example, navigation device 10 can be configured to allow a user to approximately sketch or draw a desired (or undesired) route on display 12. The sketched route can basically give a hint to the system for which route the user prefers (or does not prefer). For example, using symbols and/or colors, areas on the map can be marked as areas to be avoided or areas that are preferred. The symbols and/or colors may include various shapes, color-coded, or some other type of representation that can distinguish one area from another area, or they can be automatically assigned or set by the user as personal preferences. The sketching activity can be performed by the user to approximately indicate the route on the map regardless of the zoom level selected. In an example, navigation device 10 can be configured to allow the user to either select a preferred route, areas that are okay to consider during planning but not preferred, or sections to be avoided.

More specifically, when planning a route, route selection module 18 may take a sketched route and areas that are preferred or to be avoided into consideration and try to accommodate the user's requests. For example, a heuristic-based approach may be utilized to compare the possible routes with the user identified areas or routes that are preferred or are to be avoided. If a route to a destination crosses an area that is to be avoided, that route may be discarded. In a case where all the routes travel through an area to be avoided, the route with the least amount of overlap in the area to be avoided may be proposed to the user first. In an example, a function may be used to penalize routes that are closer to the undesirable area and distant from a desired area.

In another example, a penalty or weight factor may be assigned to each point on a map, depending on the type of area or vicinity of the route at which the point is located (that would be computationally expensive). As an alternative, voronoi diagrams may be used, where a penalty or weight factor is assigned to each voronoi polygon according to its overlap with an area that is to be avoided and/or an area that is preferred or acceptable. Voronoi diagrams are commonly used in spatial systems to perform space decomposition and spatial queries. To have a measure of how close a computer route is to a user sketched route, an algorithm such as dynamic time warping (DTW) may be utilized to compare the two routes. DTW is commonly used in time series, such as handwriting, to compare two time-varying and/or space-varying signals.

Figure 1B:
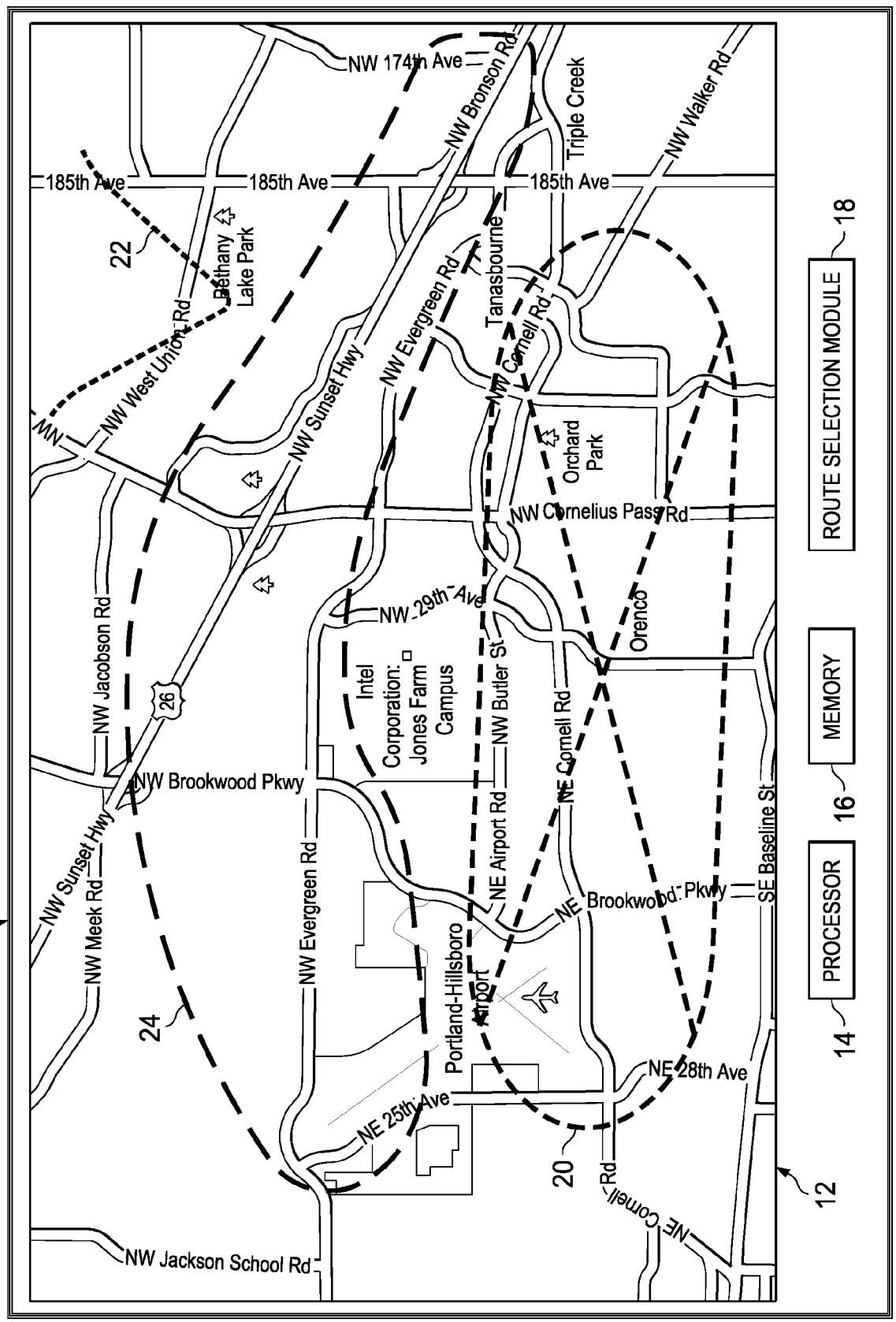
FIG. 1B is a simplified block diagram illustrating an example of an electronic device.

FIG. 1B is a simplified diagram illustrating an example of navigation device 10. As illustrated in FIG. 1B, an avoid area symbol 20 has been drawn in one area, an acceptable area symbol 22 has been drawn in another area, and a preferred area symbol 24 has been drawn in yet another area. Avoid area symbol 20, acceptable area symbol 22, and preferred area symbol 24 are merely representations, as they reflect any symbol the user may use to designate an area. For example, while acceptable area symbol 22 is shown having a "v" profile, a check mark, the word "OK", or some other symbol may be used to designate the area as an acceptable area. Appropriate algorithms, such as DTW, Hidden Markov Model (HMM), or other methods can be used to recognize the symbol being drawn. For example, the user can select (or draw) the symbol(s) during a training phase and put those symbols in a dictionary. An algorithm, at runtime, can detect the most similar symbol in the dictionary and attach a label accordingly the surrounding area that is comprised in the closed convex shape drawn by the user.

Avoid area symbol 20 indicates an area that the user does not want the route pass through. For example, the area covered by avoid area symbol 20 may have heavy construction or may be particularly busy at a certain time of day or experience very dynamic or unpredictable conditions. Acceptable area symbol 22 indicates an area that is acceptable for the route to pass through. For example, the area covered by acceptable area symbol 22 may be an area that the user would not mind if the route passed through the area. Preferred are symbol 24 indicates a preferred area for the route to pass through. For example, the area covered by preferred area symbol 24 may be scenic, have well-maintained roads, smooth roads, typically not have very much traffic, etc. The term "road" is used to encompass a street, highway, interstate, or any other thoroughfare, route, or way between two places, which has been paved or otherwise improved to allow travel.

Figure 1C:
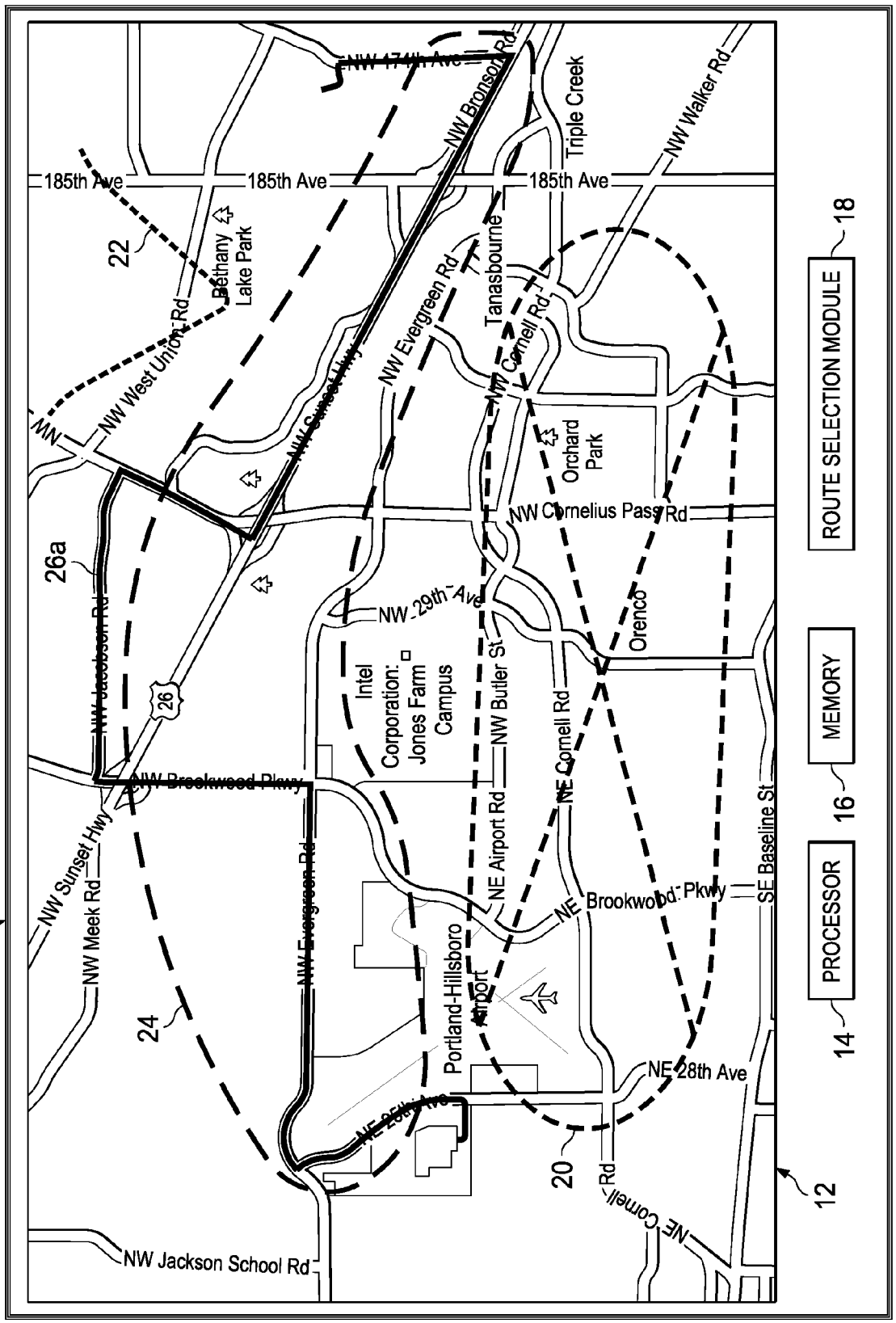
FIG. 1C is a simplified block diagram illustrating an example of an electronic device.

FIG. 1C is a simplified diagram illustrating an example of navigation device 10. As illustrated in FIG. 1C, route selection module 18 has generated route 26a. Route 26a is mostly within the area around preferred area symbol 24 and a small portion of generated route 26a extends into the acceptable area designated with acceptable are symbol 22. Route 26a does not extend into the area around avoid area symbol 20.

FIG. 2A is a simplified diagram illustrating an example of navigation device 10. As illustrated in FIG. 2A, a relatively large and not very detailed map is displayed on display 12. The relatively large map may be used when it is desired that the route go through a general area. For example, if the route was to start in Alexandria, Va. and the destination was someplace in Mississippi, then a preferred area symbol 24 could be drawn between the start and destination point. If it was preferable for the route to pass through the state of Tennessee, then preferred area symbol 24 could be drawn to include Tennessee, as shown. If for some reason it was preferable for the route to not pass through Georgia, then avoid area symbol 20 could be drawn around Georgia. A zoom out selector 28 may be used to increase area shown on display 12. A zoom in selector 26 may be used to decrease the area shown on display 12.

In another example, shown in FIG. 2B, if the route was to start in Raleigh, N.C. and the destination was Alexandria, Va., and it did not really matter the route taken (e.g., there are no areas to avoid), then a preferred area symbol 24 could be drawn between the start and destination point. Because preferred area symbol 24 was drawn on a relatively large and not very detailed map, as illustrated in FIG. 2C, a route 26b generated by route selection module 18 may be displayed on display 12. If more control over the route is desired, then zoom in selector 26 may be used to zoom on the map, as shown in FIG. 2D.

Figure 2E:
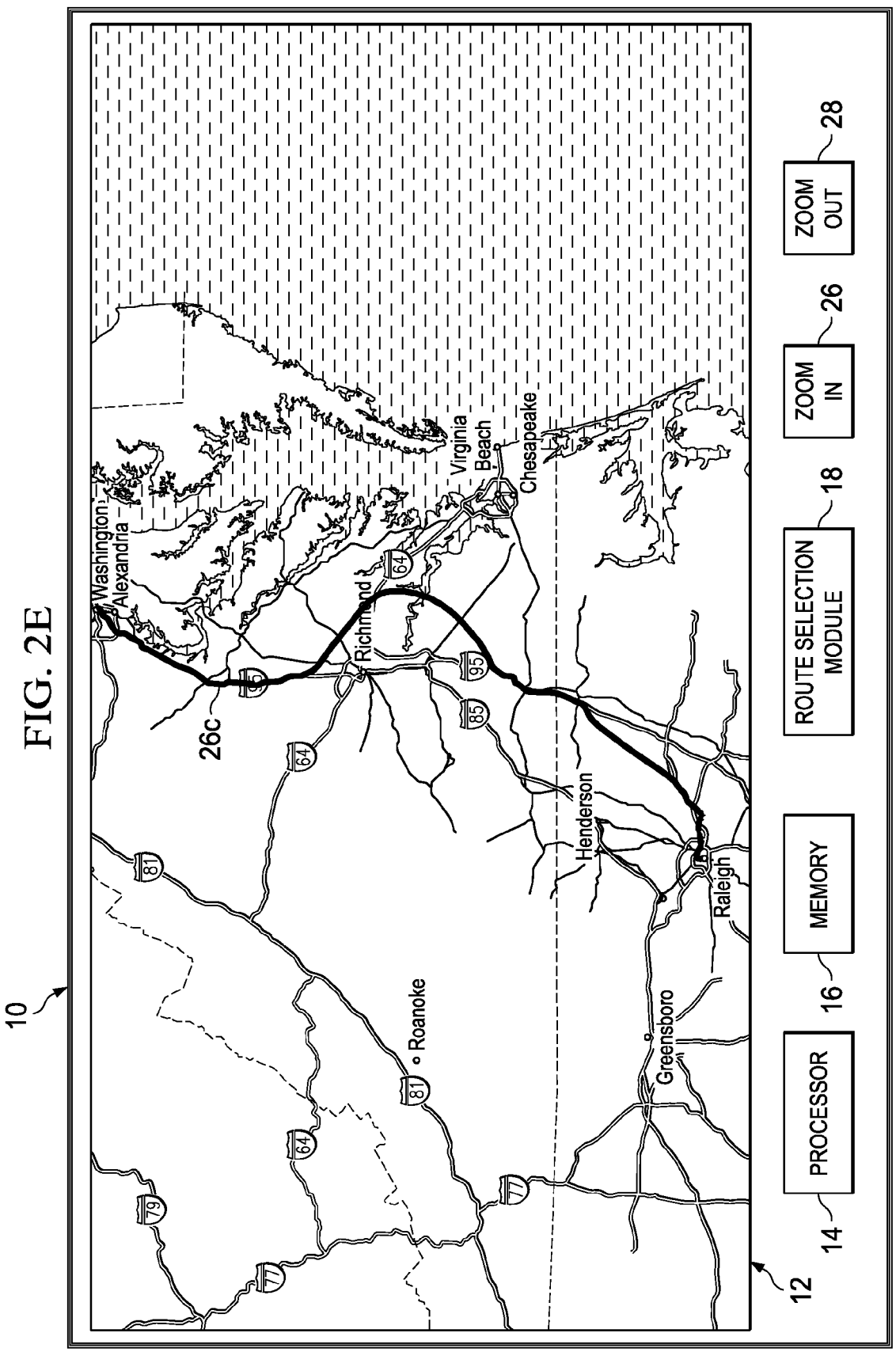
FIG. 2E is a simplified block diagram illustrating an example of an electronic device.

FIG. 2D is a simplified diagram illustrating an example of navigation device 10. As illustrated in FIG. 2D, a more detailed map than shown in FIG. 2B is displayed on display 12. The map may be used when it is desired that the route go through a specific general area. For example, if the route was to start in Raleigh, N.C. and the destination was Alexandria, Va., and it was desirable for the route to go through a bay area that is close to Richmond, Va. and off of Interstate 95, then avoid area symbol 20 could be drawn to include the area around Interstate 95 that should be avoided and preferred area symbol 24 could be drawn between the start and destination point and could include the desired bay area. Because avoid area symbol 20 was drawn to include the area around Interstate 95 that should be avoided and preferred area symbol 24 was drawn that included the bay area that is preferred, as illustrated in FIG. 2E, a route 26c may be generated by route selection module 18 that includes the bay area but not Interstate 95 and the route can be displayed on display 12. If more control over the route is desired, then zoom in selector 26 may be used to zoom on the map, as shown in FIG. 2F.

Figure 2F:
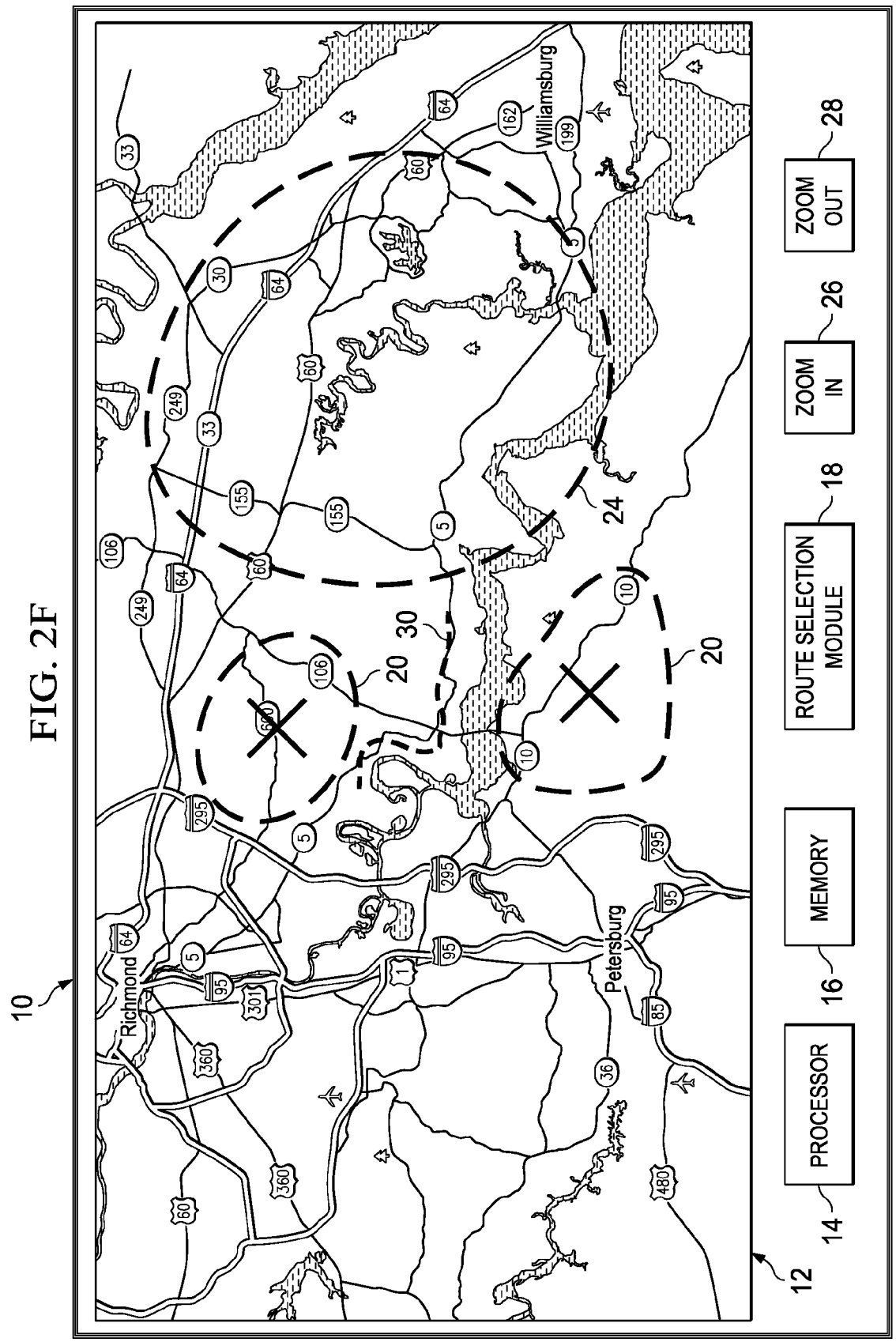
FIG. 2F is a simplified block diagram illustrating an example of an electronic device.
Figure 2G:
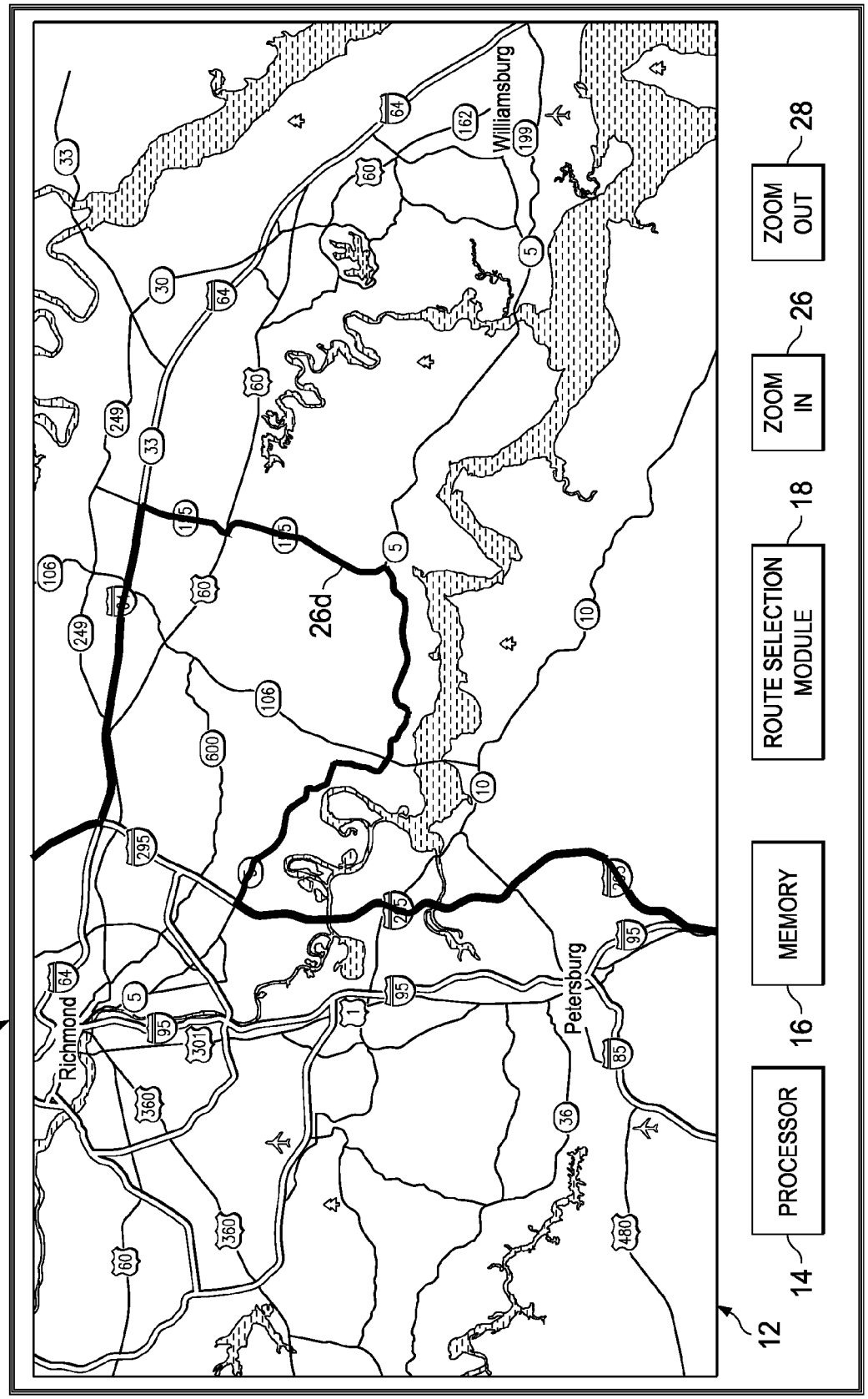
FIG. 2G is a simplified block diagram illustrating an example of an electronic device.

FIG. 2F is a simplified diagram illustrating an example of navigation device 10. As illustrated in FIG. 2F, a more detailed map than shown in FIG. 2D is displayed on display 12. The map may be used when it is desired that the route go through a specific area or use a specific road. For example, a desirable route may include a specific road, (e.g., Highway 5 outside of Richmond, Va.) and/or a specific area (e.g., an area that is west of Williamsburg, Va.). If such a route is desired, then preferred area symbol 24 may be used to designate the preferred area. A specific road symbol 30 may be used to designate the preferred road. Avoid area symbol 20 may be used to designate areas the route should not pass through. Because preferred area symbol 24 was drawn that included the area west of Williamsburg and specific road symbol 30 was drawn on (or close to Highway 5), as illustrated in FIG. 2G, a route 26d may be generated by route selection module 18 that includes Highway 5 and goes through an area that is west of Williamsburg and the route can be displayed on display 12.

Figure 3:
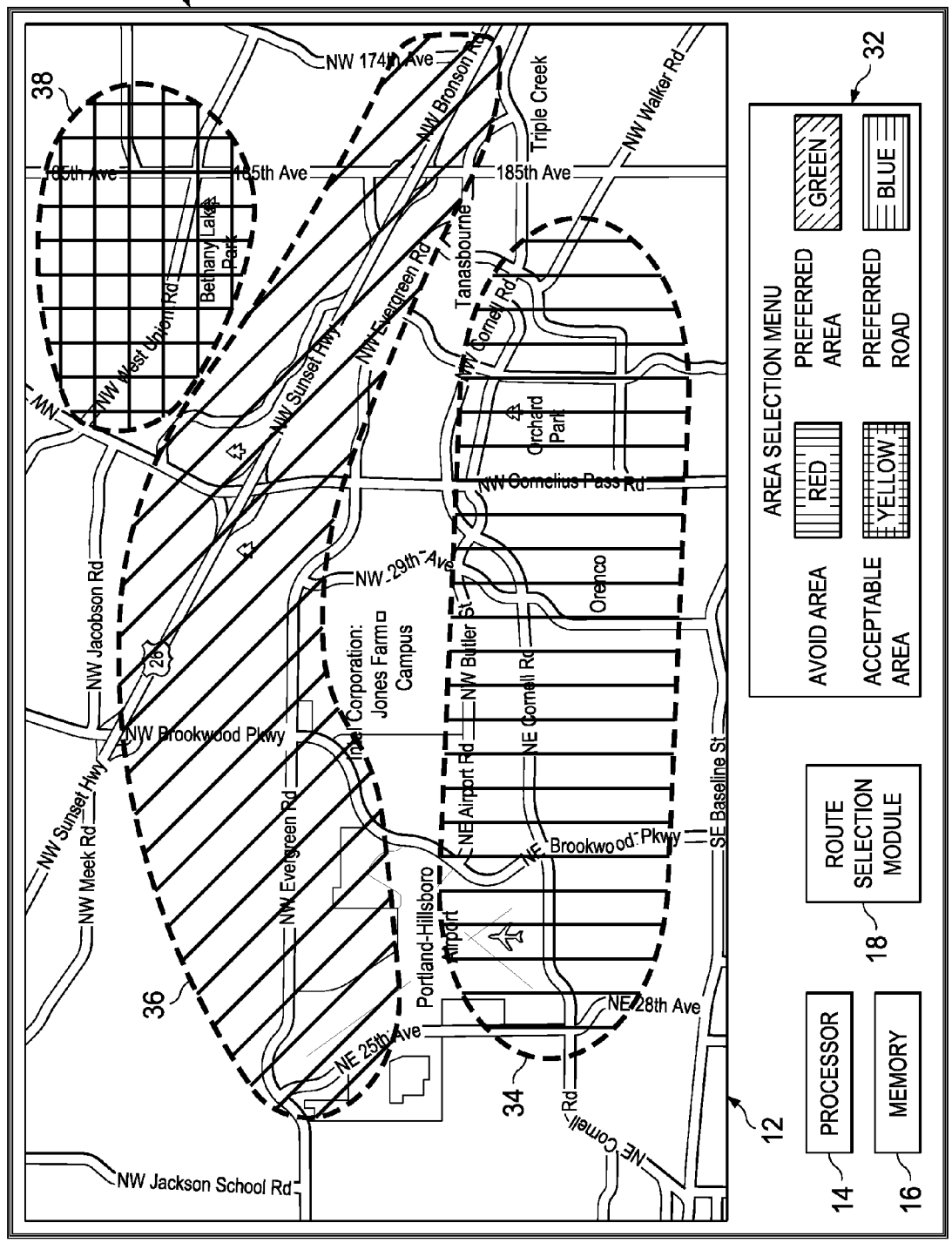
FIG. 3 is a simplified block diagram illustrating an example of an electronic device.

FIG. 3 is a simplified diagram illustrating an example of navigation device 10. As illustrated in FIG. 3, color instead of a symbol may be used to designate areas on the map shown on display 12. For example, area select menu 32 may be used to designate an area. More specifically, an area to avoid may be designated with the color red. By selecting a red box in area election menu 32 and then selecting the area to avoid on the map shown on display 12, an avoid area 34 indication can be used to designate an area to avoid. Similarly, the color green can be used to designate a preferred area as illustrated by a preferred area 36 and the color yellow can be used to designate an acceptable area as illustrated by an acceptable area 38. The colors used to designate the area(s) to avoid, acceptable area(s), and preferred area(s) are merely representations and may be any color the user may use to designate an area. For example, while acceptable area is shown as being the color yellow, the color orange, purple, pink, or some other color may be used to designate the area as an acceptable area.

Figure 4:
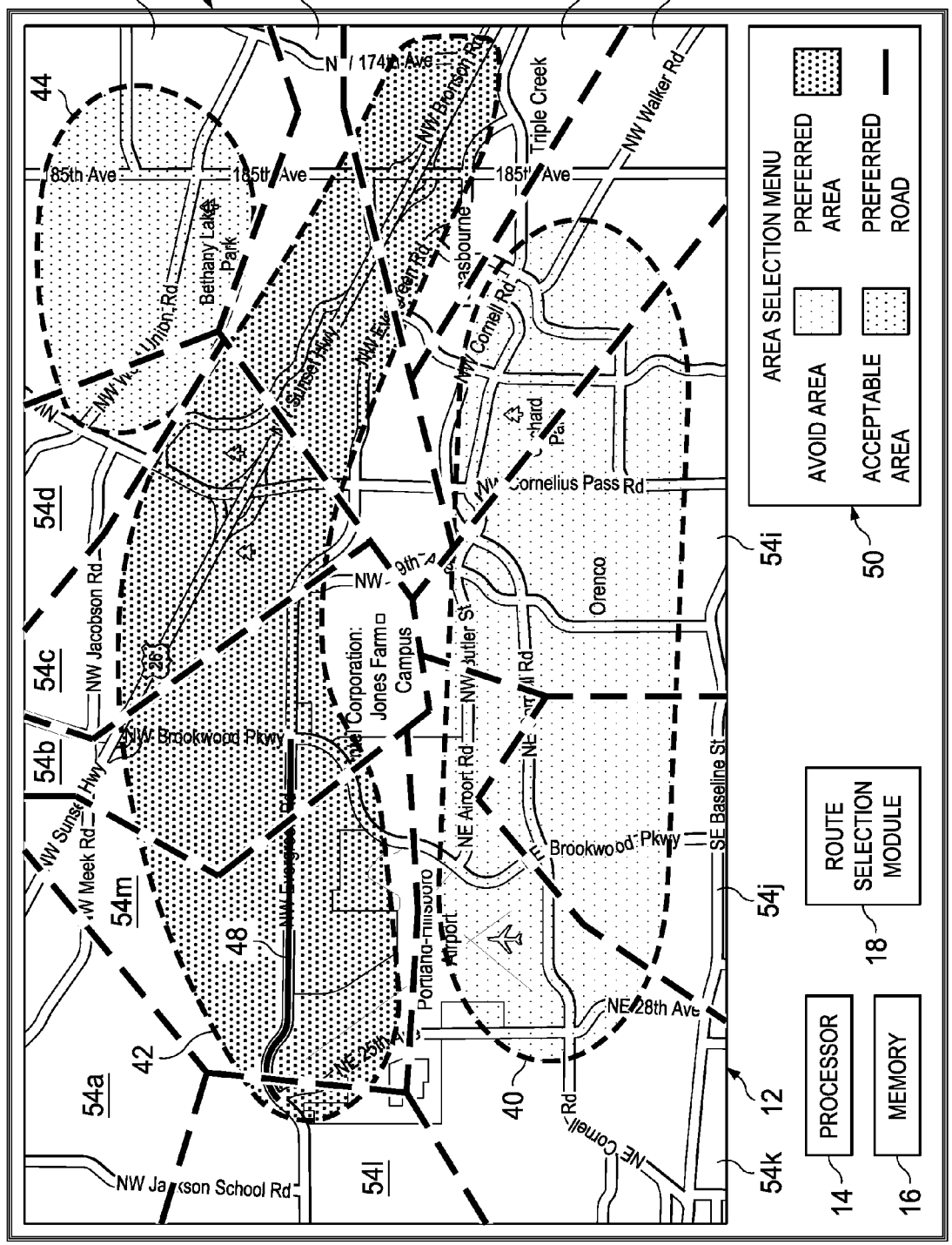
FIG. 4 is a simplified block diagram illustrating an example of an electronic device.

FIG. 4 is a simplified diagram illustrating an example of navigation device 10. As illustrated in FIG. 4, a voronoi type diagram having voronoi cells 54a-l (or some other representation that can be assigned a penalty or weight factor) can be used. For example, voronoi polygons 54h-l may have a high penalty factor and/or low or negative weight factor because they are in or include at least a portion of the area covered by avoid area indicator 40.

An acceptable area indicator 44 may not have any penalty factor, a low penalty factor, or a relatively low weight factor. A preferred area indicator 42 may not have any penalty factor and a relatively high weight factor or one that is higher than acceptable area 44. A preferred road indicator 48 may not have any penalty factor and a relatively high weight factor or one that is higher than preferred area 42. Using the penalty or weight factors, an algorithm (or some other analysis) may be used to determine a preferred route. Areas not covered by an indicator may not have any penalty factor or weight value assigned and may be considered neutral.

Figure 5:
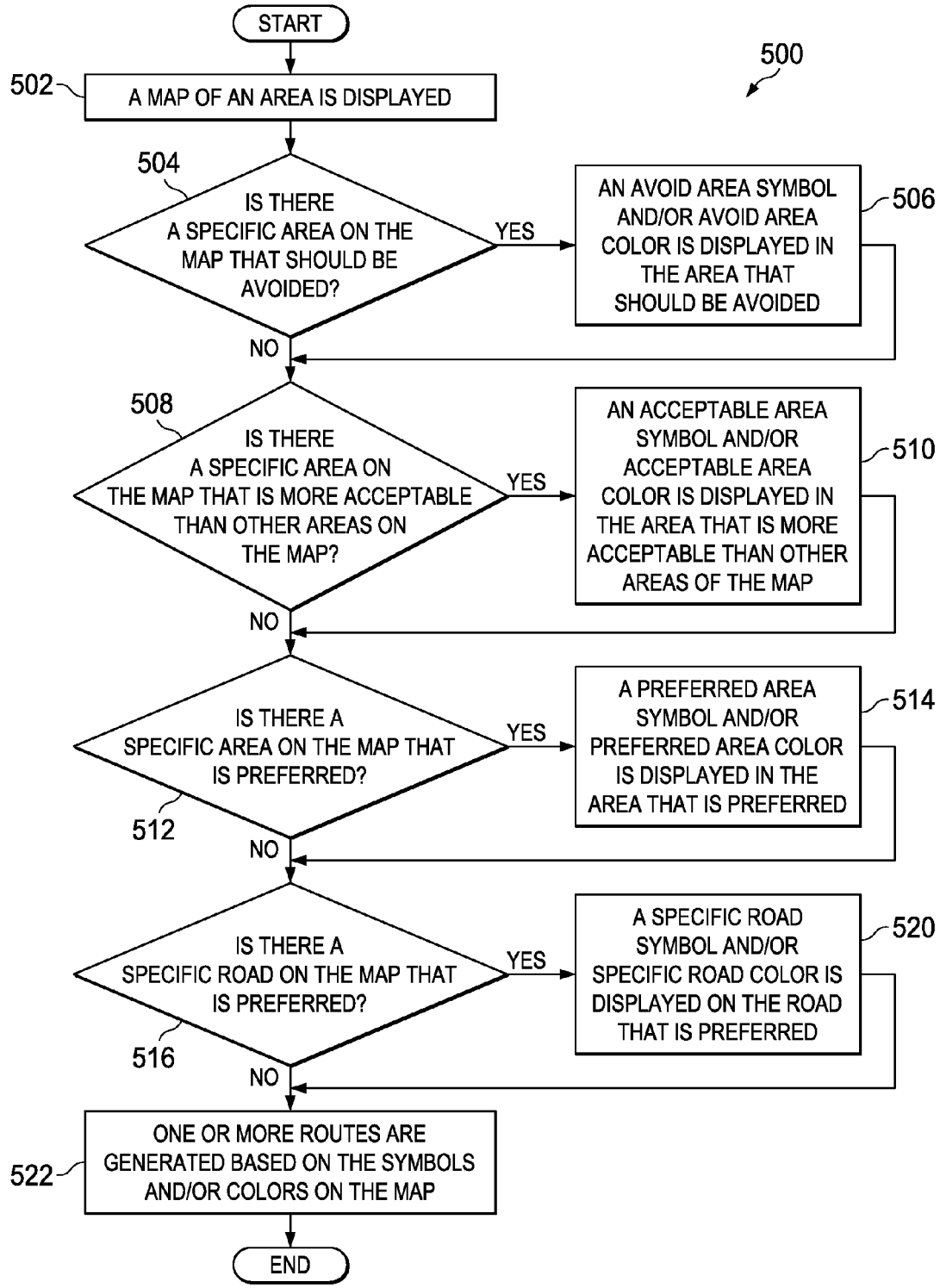
FIG. 5 illustrates an example flow diagram in accordance with at least one example of the present disclosure.

FIG. 5 is a simplified flowchart 500 illustrating example activities of a sketch aided route selection system. At 502, a map of an area is displayed. At 504, the system determines if there is a specific area on the map that should be avoided. If there is a specific area on the map that should be avoided, then an avoid area symbol and/or an avoid area color is displayed in the area that should be avoided, as in 506. For example, a user may draw or place a symbol or color around an area that should be avoided and the symbol or color will be displayed on the map in the area that should be avoided. If there is not a specific area on the map that should be avoided, then the system determines if there is a specific area on the map that is more acceptable than other areas on the map, as in 508.

If there is a specific area on the map that is more acceptable than other areas on the map, then an acceptable area symbol and/or an acceptable area color is displayed in the area that is more acceptable than other areas on the map, as in 510. For example, a user may draw or place a symbol or color around an area that is more acceptable than other areas on the map and the symbol or color will be displayed on the map in the area that is more acceptable than other areas on the map. If there is not a specific area on the map that is more acceptable than other areas on the map, then the system determines if there is a specific area on the map that is preferred, as in 512.

If there is an area on the map that is preferred, then a preferred area symbol and/or a preferred area color is displayed in the area that is preferred, as in 514. For example, a user may draw or place a symbol or color around an area that is preferred and the symbol or color will be displayed on the map in the area that is preferred. If there is not a specific area on the map that is preferred, then the system determines if there is a specific road on the map that is preferred, as in 516.

If there is a specific road on the map that is preferred, then a specific road symbol and/or a specific road color is displayed in the road that is preferred, as in 520. For example, a user may draw or place a symbol or color on a road that is preferred and the symbol or color will be displayed on the map in the road that is preferred. If there is not a specific road on the map that is preferred, then one or more routes are generated based on the symbols and/or colors (if any) on the map, as in 522. It should be understood that the "level" of preference might not be constrained to preferred/neutral/avoid but can include any scale of preference (e.g., areas could be assigned a number from one to ten). Also, any input method that enables the super imposition of a map and user defined areas or any other method that would facilitate the functionalities described herein are included in the spirit of this application.

Figure 6:
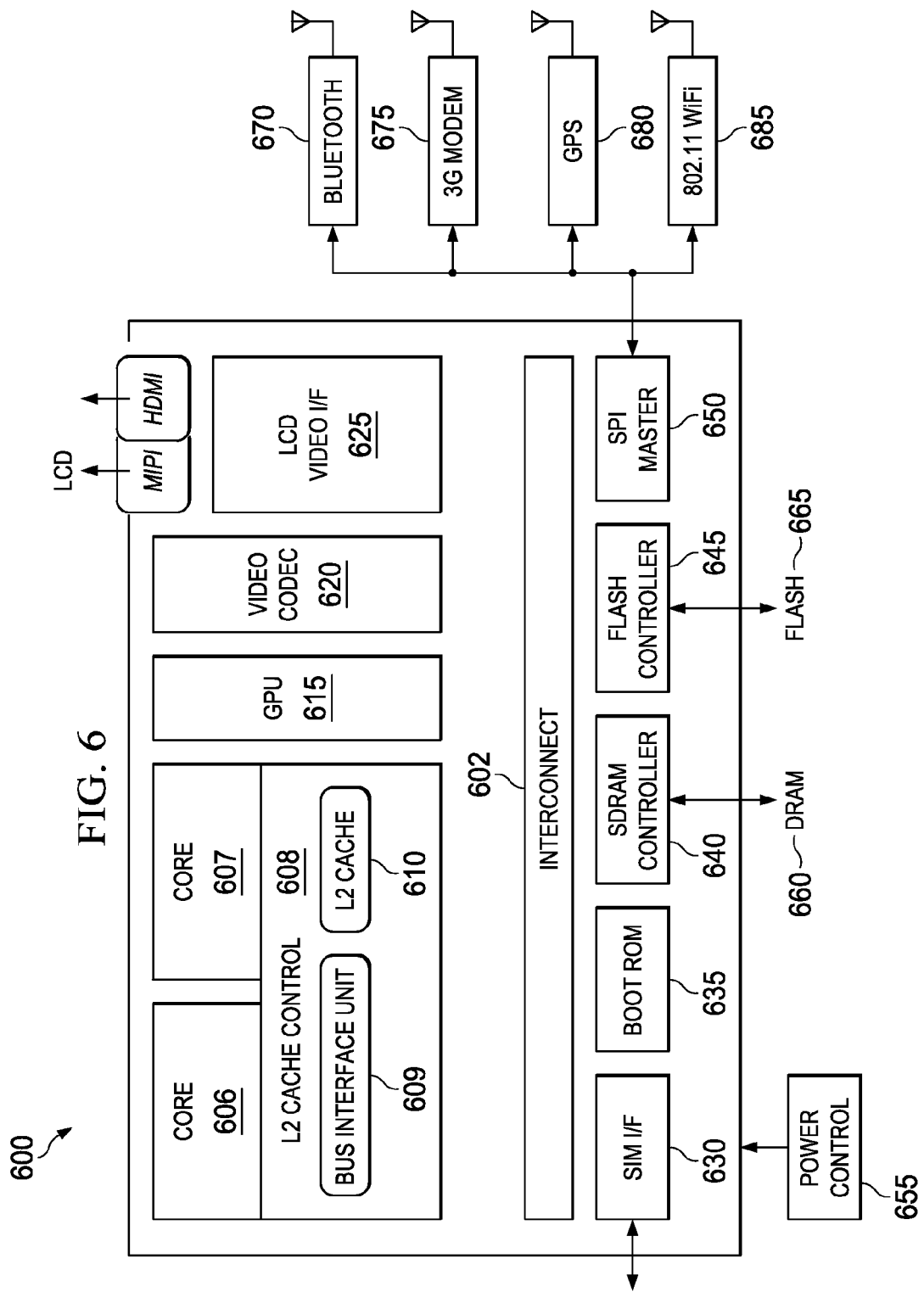
FIG. 6 is a simplified block diagram associated with an example ecosystem system on chip (SOC) of the present disclosure.

FIG. 6 is a simplified block diagram associated with an example ecosystem SOC 600 of the present disclosure. At least one example implementation of the present disclosure can include an integration of the route generation features discussed herein and a component. For example, the example of FIG. 6 can be associated with any core (e.g., A-9, A-15, etc.). Further, the architecture can be part of any type of navigation system, tablet, smartphone (inclusive of Android™ phones, i-Phones™), i-Pad™, Google Nexus™, Microsoft Surface™, personal computer, server, mobile internet device, video processing components, laptop computer (inclusive of any type of notebook), Ultrabook™ system, any type of touch-enabled input device, etc.

In this example of FIG. 6, ecosystem SOC 600 may include multiple cores 606-607, an L2 cache control 608, a bus interface unit 609, an L2 cache 610, a graphics processing unit (GPU) 615, an interconnect 602, a video codec 620, and a liquid crystal display (LCD) I/F 625, which may be associated with mobile industry processor interface (MIPI)/high-definition multimedia interface (HDMI) links that couple to an LDC.

Ecosystem SOC 600 may also include a subscriber identity module (SIM) I/F 630, a boot read-only memory (ROM) 635, a synchronous dynamic random access memory (SDRAM) controller 640, a flash controller 645, a serial peripheral interface (SPI) master 650, a suitable power control 655, a dynamic RAM (DRAM) 660, and flash 665. In addition, one or more examples include one or more communication capabilities, interfaces, and features such as instances of Bluetooth™ 670, a 3G modem 675, a global positioning system (GPS) 680, and an 802.11 WiFi 685.

In operation, the example of FIG. 6 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example, the core processor may implement an out-of-order superscalar pipeline with a coupled low-latency level-2 cache.

Figure 7:
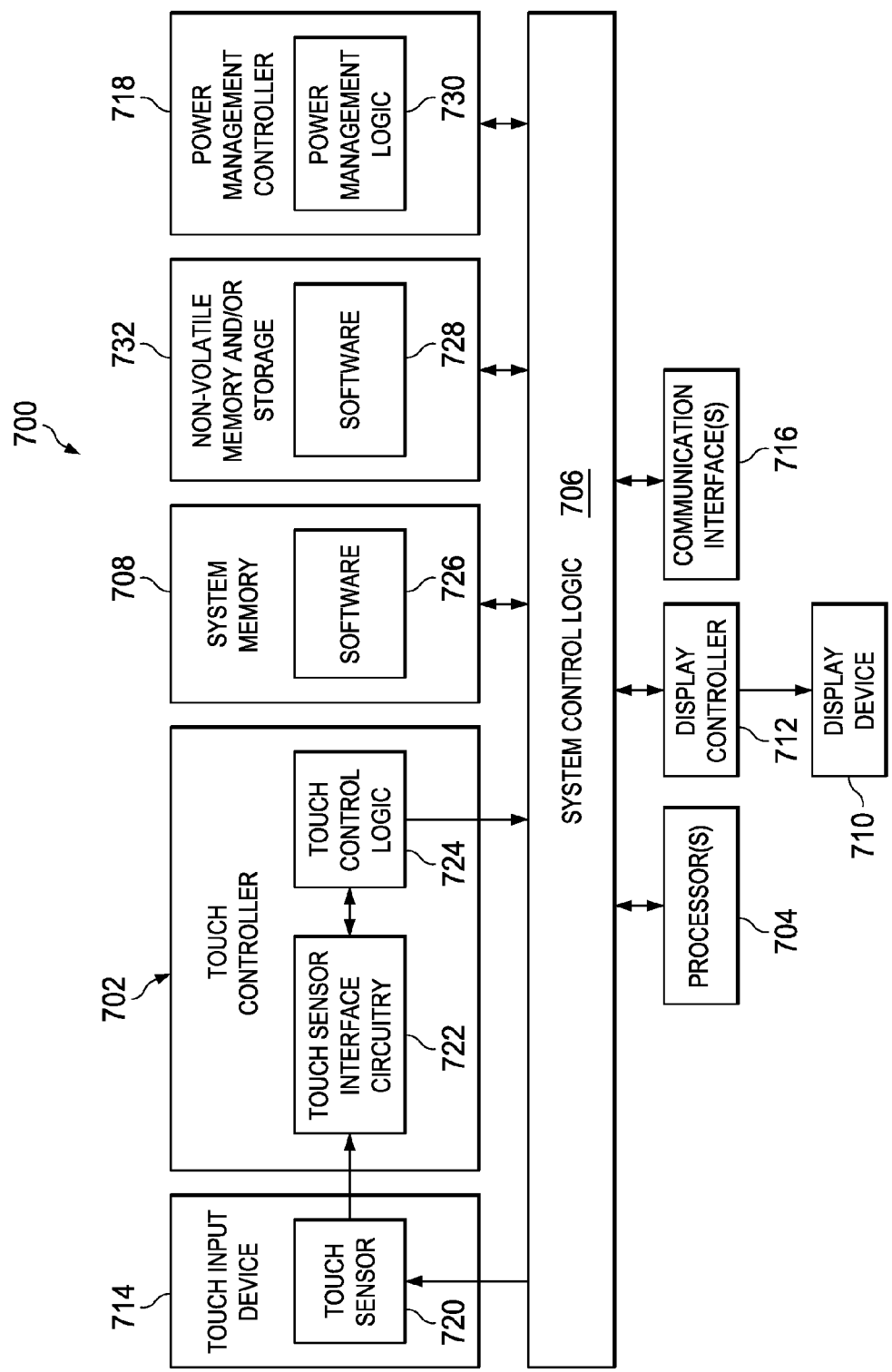
FIG. 7 is a simplified block diagram illustrating example logic that may be used to execute activities associated with the present disclosure.

FIG. 7 is a simplified block diagram illustrating potential electronics and logic that may be associated with any of the route generation operations discussed herein. In at least one example, system 700 can include a touch controller 702, one or more processors 704, system control logic 706 coupled to at least one of processor(s) 704, system memory 708 coupled to system control logic 706, non-volatile memory and/or storage device(s) 732 coupled to system control logic 706, display controller 712 coupled to system control logic 732, display controller 712 coupled to a display device 710, power management controller 718 coupled to system control logic 706, and/or communication interfaces 716 coupled to system control logic 706.

System control logic 706, in at least one example, can include any suitable interface controllers to provide for any suitable interface to at least one processor 704 and/or to any suitable device or component in communication with system control logic 706. System control logic 706, in at least one example, can include one or more memory controllers to provide an interface to system memory 708. System memory 708 may be used to load and store data and/or instructions, for example, for system 700. System memory 708, in at least one example, can include any suitable volatile memory, such as suitable dynamic random access memory (DRAM) for example. System control logic 706, in at least one example, can include one or more I/O controllers to provide an interface to display device 710, touch controller 702, and non-volatile memory and/or storage device(s) 732.

Non-volatile memory and/or storage device(s) 732 may be used to store data and/or instructions, for example within software 728. Non-volatile memory and/or storage device(s) 732 may include any suitable non-volatile memory, such as flash memory for example, and/or may include any suitable non-volatile storage device(s), such as one or more hard disc drives (HDDs), one or more compact disc (CD) drives, and/or one or more digital versatile disc (DVD) drives for example.

Power management controller 718 may include power management logic 730 configured to control various power management and/or power saving functions disclosed herein or any part thereof. In at least one example, power management controller 718 is configured to reduce the power consumption of components or devices of system 700 that may either be operated at reduced power or turned off when the electronic device is in a closed configuration. For example, in at least one example, when the electronic device is in a closed configuration, power management controller 718 performs one or more of the following: power down the unused portion of the display and/or any backlight associated therewith; allow one or more of processor(s) 704 to go to a lower power state if less computing power is required in the closed configuration; and shutdown any devices and/or components that are unused when an electronic device is in the closed configuration.

Communications interface(s) 716 may provide an interface for system 700 to communicate over one or more networks and/or with any other suitable device. Communications interface(s) 716 may include any suitable hardware and/or firmware. Communications interface(s) 716, in at least one example, may include, for example, a network adapter, a wireless network adapter, a telephone modem, and/or a wireless modem.

System control logic 706, in at least one example, can include one or more I/O controllers to provide an interface to any suitable input/output device(s) such as, for example, an audio device to help convert sound into corresponding digital signals and/or to help convert digital signals into corresponding sound, a camera, a camcorder, a printer, and/or a scanner.

For at least one example, at least one processor 704 may be packaged together with logic for one or more controllers of system control logic 706. In at least one example, at least one processor 704 may be packaged together with logic for one or more controllers of system control logic 706 to form a System in Package (SiP). In at least one example, at least one processor 704 may be integrated on the same die with logic for one or more controllers of system control logic 706. For at least one example, at least one processor 704 may be integrated on the same die with logic for one or more controllers of system control logic 706 to form a System on Chip (SoC).

For touch control, touch controller 702 may include touch sensor interface circuitry 722 and touch control logic 724. Touch sensor interface circuitry 722 may be coupled to detect touch input over a first touch surface layer and a second touch surface layer of a display (i.e., display device 710). Touch sensor interface circuitry 722 may include any suitable circuitry that may depend, for example, at least in part on the touch-sensitive technology used for a touch input device. Touch sensor interface circuitry 722, in one example, may support any suitable multi-touch technology. Touch sensor interface circuitry 722, in at least one example, can include any suitable circuitry to convert analog signals corresponding to a first touch surface layer and a second surface layer into any suitable digital touch input data.

Suitable digital touch input data, for at least one example, may include, for example, touch location or coordinate data.

Touch control logic 724 may be coupled to help control touch sensor interface circuitry 722 in any suitable manner to detect touch input over a first touch surface layer and a second touch surface layer. Touch control logic 724, for at least one example, may also be coupled to output in any suitable manner digital touch input data corresponding to touch input detected by touch sensor interface circuitry 722. Touch control logic 724 may be implemented using any suitable logic, including any suitable hardware, firmware, and/or software logic (e.g., non-transitory tangible media), that may depend, for example, at least in part on the circuitry used for touch sensor interface circuitry 722. Touch control logic 724, for at least one example, may support any suitable multi-touch technology.

Touch control logic 724 may be coupled to output digital touch input data to system control logic 706 and/or at least one processor 704 for processing. At least one processor 704, for at least one example, may execute any suitable software to process digital touch input data output from touch control logic 724. Suitable software may include, for example, any suitable driver software and/or any suitable application software. As illustrated in FIG. 7, system memory 708 may store suitable software 726 and/or nonvolatile memory and/or storage device(s).

Note that in some example implementations, the functions outlined herein may be implemented in conjunction with logic that is encoded in one or more tangible, non-transitory media (e.g., embedded logic provided in an application-specific integrated circuit (ASIC), in digital signal processor (DSP) instructions, software [potentially inclusive of object code and source code] to be executed by a processor, or other similar machine, etc.). In some of these instances, memory elements can store data used for the operations described herein. This can include the memory elements being able to store software, logic, code, or processor instructions that are executed to carry out the activities described herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a DSP, an erasable programmable read only memory (EPROM), electrically erasable programmable read-only memory (EEPROM)) or an ASIC that can include digital logic, software, code, electronic instructions, or any suitable combination thereof.

Note that with the examples provided above, as well as numerous other examples provided herein, interaction may be described in terms of layers, protocols, interfaces, spaces, and environments more generally. However, this has been done for purposes of clarity and example only. In certain cases, it may be easier to describe one or more of the functionalities of a given set of flows by only referencing a limited number of components. It should be appreciated that the architectures discussed herein (and its teachings) are readily scalable and can accommodate a large number of components, as well as more complicated/sophisticated arrangements and configurations. Accordingly, the examples provided should not limit the scope or inhibit the broad teachings of the present disclosure, as potentially applied to a myriad of other architectures.

It is also important to note that the blocks in the flow diagrams illustrate only some of the possible signaling scenarios and patterns that may be executed by, or within, the circuits discussed herein. Some of these blocks may be deleted or removed where appropriate, or these steps may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the present disclosure in that any suitable arrangements, chronologies, configurations, and timing mechanisms may be provided without departing from the teachings provided herein.

It is also imperative to note that all of the Specifications, protocols, and relationships outlined herein (e.g., specific commands, timing intervals, supporting ancillary components, etc.) have only been offered for purposes of example and teaching only. Each of these data may be varied considerably without departing from the spirit of the present disclosure, or the scope of the appended claims. The specifications apply to many varying and non-limiting examples and, accordingly, they should be construed as such. In the foregoing description, examples have been described. Various modifications and changes may be made to such examples without departing from the scope of the appended claims. The description and drawings are, accordingly, to be regarded in an illustrative rather than a restrictive sense.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

OTHER NOTES AND EXAMPLES

Note that all optional features of the apparatus described above may also be implemented with respect to the method or process described herein and specifics in the examples may be used anywhere in one or more embodiments.

Example A1 is an apparatus for route selection in navigation devices and applications, the apparatus comprising: at least one processor, at least one memory element, at least one module adapted, when executed by the processor, to perform operations including displaying a map of a first area on a display; receiving an instruction to designate a second area on the map to be avoided; displaying the second area to be avoided on the map; and generating a route from a first point to a second point, where the route does not go through the second area to be avoided.

In Example A2, the subject matter of Example A1 can optionally include where the user selects the area to be avoided on the map by using an avoid area symbol or an avoid area color.

In Example A3, the subject matter of any one of Examples A1-A2 can optionally include the at least one module further adapted, when executed by the processor, to: display a preferred area on the map, where the preferred area is selected by a user and is an area that the user prefers, and where the route from one point to another point passes through the preferred area.

In Example A4, the subject matter of Example A3 can optionally include where the user selects the preferred area on the map by using a preferred area symbol or a preferred area color.

In Example A5, the subject matter of any one of Examples A3-A4 can optionally include where the display is a touch display and the user selects the area to be avoided and the preferred area by drawing a preferred area symbol on the display.

In Example A6, the subject matter of any one of Examples A3-A5 can optionally include the at least one module further adapted, when executed by the processor, to: assign a first weight factor to the area to be avoided; and assign a second weight factor to the preferred area, where the first weight factor is less than the second weight factor, and where the route is generated using the first and second weight factor.

In Example A7, the subject matter of any one of Examples A3-A6 can optionally include where voronoi diagrams are used to assign the first weight factor to the area to be avoided and the second weight factor to the preferred areas.

In Example A8, the subject matter of any one of the Example A1-A7 can optionally include the at least one module further adapted, when executed by the processor, to: generate multiple routes from the one point to another point, where any route that crosses an area to be avoided is discarded.

In Example A9, the subject matter of any one of Examples A3-A8 can optionally include where an algorithm compares the multiple routes to determine the routes that pass through the area that is to be avoided and the routes that pass through the area that the user prefers.

In Example A10, the subject matter of any one of Example A9 can optionally include where the algorithm is a dynamic time warping (DTW) algorithm.

In Example A11 the subject matter of any one of Examples A1-A10 can optionally include the at least one module further adapted, when executed by the processor, to: display a preferred road on the map, where the preferred road is selected by a user and is a road that the user prefers, and where the route from one point to another point at least partially includes the preferred road.

In Example A12, the subject matter of Example A11 can optionally include where the user selects the preferred road on the map by using a preferred road symbol or a preferred road color.

In Example A13 the subject matter of any one of Examples A1-A12 can optionally include the at least one module further adapted, when executed by the processor, to zoom on the map of the area to provide a more detailed view of the area.

Example C1 is at least one machine readable storage medium having instructions stored thereon to manage an authentication confidence score, the instructions when executed by a processor cause the processor to: display a map of an area on a display; display an area to be avoided on the map, where the area to be avoided is selected by a user and is an area the user wants to avoid; and generate a route from one point to another point, where the route does not go through the displayed area to be avoided.

In Example C2, the subject matter of Example C1 can optionally include where the user selects the area to be avoided on the map by using an avoid area symbol or an avoid area color.

In Example C3, the subject matter of any one of Examples C1-C2 can optionally include the instructions when executed by the processor further cause the processor to: display a preferred area on the map, where the preferred area is selected by a user and is an area that the user prefers, and where the route from one point to another point passes through the preferred area.

In Example C4, the subject matter of Example C3 can optionally include where the user selects the preferred area on the map by using a preferred area symbol or a preferred area color.

In Example C5, the subject matter of any one of Examples C3-C4 can optionally include where the display is a touch display and the user selects the area to be avoided and the preferred area by drawing a preferred area symbol on the display.

In Example C6, the subject matter of any one of Example C3-05 can optionally include the instructions when executed by the processor further cause the processor to: assign a first weight factor to the area to be avoided and assign a second weight factor to the preferred area, where the first weight factor is less than the second weight factor, and where the route is generated using the first and second weight factor.

In Example C7, the subject matter of Example C6 can optionally include where voronoi diagrams are used to assign the first weight factor to the area to be avoided and the second weight factor to the preferred areas.

In Example C8, the subject matter of any one of Examples A3-C7 can optionally include the instructions when executed by the processor further cause the processor to: generate multiple routes from the one point to another point, where any route that crosses an area to be avoided is discarded.

In Example C9, the subject matter of Example C8 can optionally include where an algorithm compares the multiple routes to determine the routes that pass through the area that is to be avoided and the routes that pass through the area that the user prefers.

In Example C10, the subject matter of any one of Examples C1-C9 can optionally include the instructions when executed by the processor further cause the processor to: display a preferred road on the map, where the preferred road is selected by a user and is a road that the user prefers, and where the route from one point to another point at least partially includes the preferred road, where the user selects the preferred road on the map by using a preferred road symbol or a preferred road color.

Example M1 is a method for route selection in navigation devices and applications, comprising: displaying a map of an area on a display; displaying an area to be avoided on the map, where the area to be avoided is selected by a user and is an area the user wants to avoid; and generating a route from one point to another point, where the route does not go through the displayed area to be avoided.

In Example M2, the subject matter of Example M1 can optionally include displaying a preferred area on the map, where the preferred area is selected by a user and is an area that the user prefers, and where the route from one point to another point passes through the preferred area.

In example MP1, a system is provided (that can include a computing device such as a smartphone, a mobile device of any kind, a notebook computer, a laptop, etc.,) that can include a circuit board coupled to a plurality of electronic components (which includes any type of hardware, elements, circuitry, etc.). The system can be used for route selection in navigation devices and applications. The system can include means for displaying a map of a first area on a display; means for receiving an instruction to designate a second area on the map to be avoided; means for displaying the second area to be avoided on the map; and means for generating a route from a first point to a second point, where the route does not go through the second area to be avoided. The 'means for' in these instances (above and below) can include (but is not limited to) using any suitable processor, display, software, circuitry, hub, computer code, logic, algorithms, hardware, controller, interface, link, bus, communication pathway, etc.

In example MP2, the system as in any one of the preceding claims, where the memory comprises machine-readable instructions that when executed cause the system to perform the method of any of the preceding claims. In addition, the system as in any one of the preceding claims, where the system is a computing device. Additionally, other implementations may include at least one computer readable medium comprising instructions that, when executed, implement a method or realize an apparatus as claimed in any of the preceding claims.

What is claimed is:

1. An apparatus for navigational route selection, the apparatus comprising:
   at least one processor;
   a touch controller coupled to a display to detect touch input received at the display, the touch input comprising one or more instructions; and
   a route selection module for execution by the at least one processor to generate a route based on the touch input received at the display, wherein the route selection module, when executed by the at least one processor, is to:
   provide a map of a given area to be displayed on the display;
   receive a first indication of a first instruction to designate a first area on the map to be preferred;
   provide a designation of the first area as preferred on the map to be displayed on the display;
   receive an indication of a second instruction to designate a second area on the map to be acceptable;
   provide a designation of the second area as acceptable on the map to be displayed on the display with the designation of the first area as preferred; and
   generate the route from a first point to a second point, wherein at least a portion of the generated route passes through the second area based, at least in part, on determining the generated route cannot be completed within the first area.

2. The apparatus of claim 1, wherein an option is provided for a user to select the first area and the second area by drawing on the display.

3. The apparatus of claim 2, wherein the option to select the first area by drawing on the display includes using a first symbol or a first color, and wherein the option to select the second area by drawing on the display includes using a second symbol or a second color.

4. The apparatus of claim 1, wherein the route selection module, when executed by the at least one processor, is to: receive another indication of another instruction to designate a road on the map to be preferred, wherein the generated route at least partially includes the preferred road.

5. The apparatus of claim 4, wherein an option is provided for a user to select the preferred road by drawing a road symbol over the preferred road on the display.

6. The apparatus of claim 4, wherein the route selection module, when executed by the at least one processor, is to:
   assign a first weight factor to the first area to be preferred; and
   assign a second weight factor to the preferred road, wherein the route is generated based, at least in part, on the first and second weight factors.

7. The apparatus of claim 6, wherein voronoi diagrams are used to assign the first and second weight factors.

8. The apparatus of claim 1, wherein the route selection module, when executed by the at least one processor, is to:
   receive a third indication of a third instruction to designate a third area on the map to be avoided, wherein the generated route does not pass through the third area.

9. The apparatus of claim 8, wherein the route selection module, when executed by the at least one processor, is to:
   assign a weight factor to the first area to be preferred;
   assign a penalty factor to the third area to be avoided; and
   assign a second weight factor or a second penalty factor to the second area, wherein the route is generated based, at least in part, on the weight factor assigned to the first area, the penalty factor assigned to the third area, and one of the second weight factor or the second penalty factor assigned to the second area.

10. The apparatus of claim 8, wherein the route selection module, when executed by the at least one processor, is to:
    generate multiple routes from the first point to the second point; and
    compare the multiple routes to determine routes that pass through the first area, routes that pass through the second area, and routes that pass through the third area.

11. The apparatus of claim 1, wherein the route selection module, when executed by the at least one processor, is to:
    receive a third indication of a third instruction to designate a third area on the map based on a level of preference relative to the first and second areas, wherein respective levels of preference for the first area, the second area, and the third area are based on a scale of preferences.

12. One or more non-transitory computer readable media including code for execution stored thereon, the code when executed by a machine causes the machine to:
    provide a map of a given area to be displayed on a display;
    receive a first indication of a first instruction to designate a first area on the map to be preferred;
    provide a designation of the first area as preferred on the map to be displayed on the display;
    receive an indication of a second instruction to designate a second area on the map to be acceptable;
    provide a designation of the second area as acceptable on the map to be displayed on the display with the designation of the first area as preferred;
    generate a route from a first point to a second point, wherein at least a portion of the generated route passes through the second area based, at least in part, on determining the generated route cannot be completed within the first area; and
    provide the generated route to be displayed on the display.

13. The non-transitory computer readable media of claim 12, wherein the display is a touch display, and wherein an option is provided for a user to select the first area and the second area by drawing on the touch display.

14. The non-transitory computer readable media of claim 12, wherein the code, when executed by the machine, causes the machine to:
receive another indication of another instruction to select a preferred road on the map, wherein the generated route at least partially includes the preferred road.

15. The non-transitory computer readable media of claim 14, wherein the display is a touch display, and wherein an option is provided for a user to select the preferred road by drawing a road symbol over the preferred road on the display.

16. The non-transitory computer readable media of claim 14, wherein the code, when executed by the machine, causes the machine to:
assign a first weight factor to the first area to be preferred; and
assign a second weight factor to the preferred road, wherein the second weight factor is greater than the first weight factor, wherein the route is generated based, at least in part, on the first and second weight factors.

17. The non-transitory computer readable media of claim 12, wherein the code, when executed by the machine, causes the machine to:
receive a third indication of a third instruction to designate a third area on the map to be avoided, wherein the generated route does not pass through the third area.

18. A method for navigational route selection, the method comprising:
providing a map of a given area to be displayed on a display;
receiving a first indication of a first instruction to designate a first area on the map to be preferred;
providing a designation of the first area as preferred on the map to be displayed on the display;
receiving an indication of a second instruction to designate a second area on the map to be acceptable;
providing a designation of the second area as acceptable on the map to be displayed on the display with the designation of the first area as preferred;
generating a route from a first point to a second point, wherein at least a portion of the generated route passes through the second area based, at least in part, on determining the generated route cannot be completed within the first area; and
providing the generated route to be displayed on the display.

19. The method of claim 18, further comprising:
receiving a third indication of a third instruction to designate a third area on the map based on a level of preference relative to the first and second areas, wherein respective levels of preference for the first area, the second area, and the third area are based on a scale of preferences.

* * * * *